(No Model.)
H. D. LANFAIR.
HACK SAW MACHINE.
No. 502,978. Patented Aug. 8, 1893.
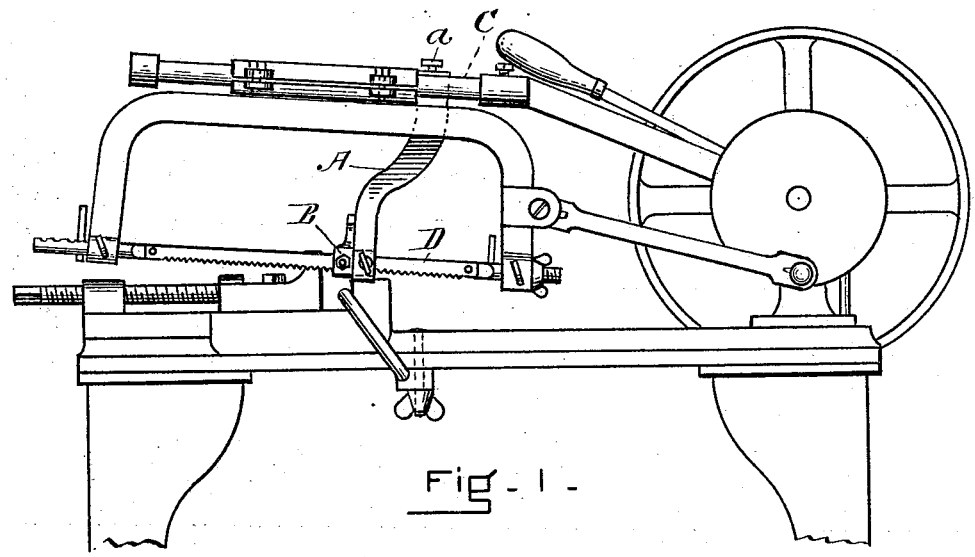
Fig. 1.
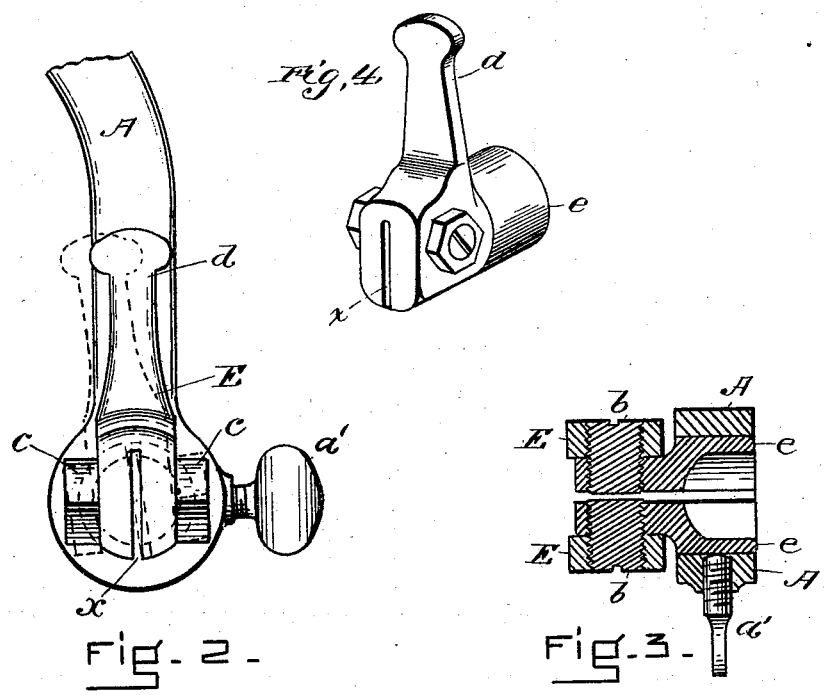
Fig. 2.
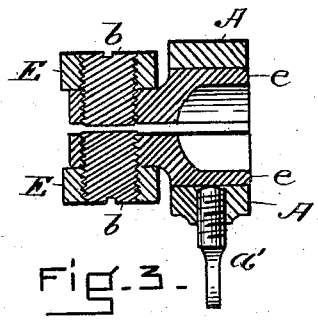
Fig. 3.
Fig. 4.
WITNESSES
Fred W. Stevens
A. H. Moir
INVENTOR
Herbert D. Lanfair
by Bowdoin S. Parker
his Atty.

UNITED STATES PATENT OFFICE.

HERBERT D. LANFAIR, OF MILLER'S FALLS, MASSACHUSETTS, ASSIGNOR TO THE MILLER'S FALLS COMPANY, OF SAME PLACE.

HACK-SAW MACHINE.

SPECIFICATION forming part of Letters Patent No. 502,978, dated August 8, 1893.

Application filed November 1, 1892. Serial No. 450,688. (No model.)

*To all whom it may concern:*

Be it known that I, HERBERT D. LANFAIR, of Miller's Falls, in the township of Erving, in the county of Franklin and State of Massachusetts, have invented a certain new and useful Improvement in Hack-Saw Machines, of which the following, taken in connection with the accompanying drawings, is a specification.

My present invention relates to hack saw machines.

In the drawings like letters of reference indicate corresponding parts.

Figure 1. represents a hack saw machine similar to those in common use, in side elevation. Fig. 2. represents a front view of the lower part of guide arm with my improved adjustable guide shown. Fig. 3. represents a sectional view of my adjustable saw guide as inserted in lower end of guide arm. Fig. 4 is a perspective of the guide detached.

My invention hereinafter described is an improvement upon my hack saw machine, Patent No. 466,929, dated January 12, 1892, to which reference is made as to the general character and description of the machine.

The special part to which the present invention relates is the guide.

In my former invention the guide was rigidly attached to the guide arm and formed its lower extremity. In practice it is found that it is extremely difficult to adjust the rigid arm in connection with the saw blade and the raising and lowering of the saw frame in relation to the work; it is found that if the teeth of the saw are a trifle longer on one side than upon the other, the saw blade will "run" or be carried out of true and thus bind in the gage, thus cramping and braking or injuring the saw blade; these together with other difficulties found especially in cutting metal of different or uneven density have presented objectionable features, all of which are sought to be overcome by my present device.

In the drawings, A. is the guide arm, which is preferably adjustably secured to the rod C. of the machine by a thumb screw or bolt $a$. The guide proper is formed of one piece of metal, with a slot $x$. into which the saw blade is placed. Upon each side of the front body of the guide E. are placed guide bolts $b.\ b.$ These are screw threaded and enter the cheeks $c.\ c.$ of the guide body one upon either side. The saw blade D. when in position passes through the slot $x$. between the inner ends of guide bolts $b.\ b.;$ by adjusting these guide bolts out and in, they will accommodate any thickness of saw and steady and guide it. The back part of the body of the guide is made round and socketed in the lower end of the guide arm A. as shown in section, Fig. 3. The socketed end of the body is indicated by $e.\ e.$ and it is free to move round, except as secured by thumb screw $a'$. The upper end of guide is preferably formed with the projection $d$. for purposes of manipulation and as a convenient indicator of the relative position of the guide to the arm. The dotted lines in Fig. 2. show the movement of the guide in relation to the body.

My device it will be seen can be made rigid at any desired angle that it is desired to set the saw or it can be left to adjust itself to the position of the saw blade by simply loosening the set screw $a'$.

It is absolutely essential that the saw have a suitable guide near the work and to be effective and overcome the serious difficulties suggested the guide must be adjustable and in some cases automatically adjustable in order to do good work without damage to the saw blade. My present device effectually overcomes these difficulties.

Having now fully described my invention, what I claim, and desire to secure by Letters Patent of the United States, is—

1. In a hack saw machine, a guide arm suitably secured to the machine, a guide consisting of a body adjustably socketed in the lower end of the guide arm, and adapted to be held by a suitable set screw and having a central longitudinal slot, for the reception of the saw blade, the slot so arranged that the center of the width of said slot, will fall in the center of the round socketed end of said body, combined and adapted to operate substantially as set forth.

2. In a hack saw machine, the guide E. provided with the slot $x$. the indicating and adjusting projection *d* the guide bolts *b. b.* and socketed end *e. e.* in combination with the guide arm A. adapted to receive the socket end of guide body, and the set screw *a'.* for securing the same, all substantially as and for the purposes set forth.

In testimony whereof I have signed my name to this specification, in the presence of two subscribing witnesses, on this 14th day of October, A. D. 1892.

HERBERT D. LANFAIR.

Witnesses:
 GEO. E. ROGERS,
 E. S. ELLIOT.